(12) United States Patent
Schiefner et al.

(10) Patent No.: US 10,970,301 B2
(45) Date of Patent: Apr. 6, 2021

(54) KEYFIGURE COMMENTS BOUND TO DATABASE LEVEL PERSISTENCE

(71) Applicant: SAP SE, Walldorf (DE)

(72) Inventors: Sandro Schiefner, Hockenheim (DE); Max Krupp, Neulußheim (DE)

(73) Assignee: SAP SE, Walldorf (DE)

( * ) Notice: Subject to any disclaimer, the term of this patent is extended or adjusted under 35 U.S.C. 154(b) by 303 days.

(21) Appl. No.: 15/855,599

(22) Filed: Dec. 27, 2017

(65) Prior Publication Data

US 2019/0197170 A1 Jun. 27, 2019

(51) Int. Cl.
*G06F 16/25* (2019.01)
*G06F 16/28* (2019.01)
*G06F 16/22* (2019.01)
*G06F 16/2455* (2019.01)

(52) U.S. Cl.
CPC ........ *G06F 16/258* (2019.01); *G06F 16/2264* (2019.01); *G06F 16/2282* (2019.01); *G06F 16/2456* (2019.01); *G06F 16/24556* (2019.01); *G06F 16/283* (2019.01)

(58) Field of Classification Search
CPC .... G06F 16/283; G06F 17/241; G06F 16/258; G06F 16/1794; G06F 16/24556; G06F 16/2282; G06F 16/2456; G06F 16/2264
See application file for complete search history.

(56) References Cited

U.S. PATENT DOCUMENTS

| | | | |
|---|---|---|---|
| 8,527,540 B2 | 9/2013 | Wu et al. | |
| 8,589,425 B2 | 11/2013 | Gonzalez et al. | |
| 8,775,349 B2 | 7/2014 | Lehner | |
| 8,806,324 B2 | 8/2014 | Theobald | |
| 9,684,643 B2 | 6/2017 | Chegini et al. | |
| 10,558,652 B2 * | 2/2020 | Schwing | G06F 16/86 |
| 2005/0075949 A1 | 4/2005 | Uhrig et al. | |
| 2006/0212469 A1 * | 9/2006 | Babanov | G06F 17/241 |
| 2008/0208880 A1 * | 8/2008 | Dong | G06F 16/22 |
| 2009/0024660 A1 * | 1/2009 | Borgsmidt | G06F 16/283 |
| 2009/0144313 A1 * | 6/2009 | Hodge | G06F 17/2235 |
| 2010/0095198 A1 | 4/2010 | Bultrowicz et al. | |
| 2013/0283147 A1 | 10/2013 | Wong et al. | |
| 2014/0359425 A1 | 12/2014 | Van Der Molen et al. | |

(Continued)

*Primary Examiner* — Jesse P Frumkin
(74) *Attorney, Agent, or Firm* — Fountainhead Law Group P.C.

(57) ABSTRACT

Comments are flexibly bound to keyfigures of an in-memory database, through reference to dimension dependency table(s). An in-memory database engine creates a comment bound to a first tuple via a first comment table. The first tuple comprises a first dimension (e.g., Product). A user then requests a second tuple comprising a second dimension (e.g., Product Group) related to the first dimension. In response, the in-memory database engine references a dimension dependency table to determine dimension dependency information. Based upon that information, the engine transforms the comment to also be bound to the second tuple via a second comment table. The second tuple is then returned to the user together with the comment, even though the second tuple may not explicitly share dimensions with the first tuple. Embodiments may leverage the processing power and data proximity of the in-memory database engine, to efficiently transform comments by executing aggregation (e.g., join) operations.

13 Claims, 7 Drawing Sheets

(56) References Cited

U.S. PATENT DOCUMENTS

| | | | |
|---|---|---|---|
| 2016/0103903 A1* | 4/2016 | Vivalda | H04L 65/403 |
| | | | 709/204 |
| 2016/0110425 A1* | 4/2016 | Ballantine | G06F 17/2235 |
| | | | 715/205 |
| 2019/0079969 A1* | 3/2019 | Ghaemi | G06F 16/2455 |
| 2019/0107548 A1* | 4/2019 | Bohnsack | G06Q 10/20 |

* cited by examiner

KEYFIGURE COMMENTS BOUND TO DATABASE LEVEL PERSISTENCE

BACKGROUND

Unless otherwise indicated herein, the approaches described in this section are not prior art to the claims in this application and are not admitted to be prior art by inclusion in this section.

Databases are useful structures for storing and manipulating pieces of information exhibiting complex relationships with one another. Some databases feature keyfigures that comprise assemblages of multiple pieces of data into larger data objects.

A keyfigure may comprise one or more dimensions in various combinations. A user may frequently switch between planning views that include different sets of dimensions.

It may be desirable to annotate a keyfigure with helpful comments from multiple reviewers, for retention and circulation along with the keyfigure. However, the flexible relationships between data objects and dimensions can hamper the implementation of such comment functionality, such that comments that may be relevant to another data object are not available to a reviewer.

SUMMARY

Comments are created and flexibly bound to keyfigures of an in-memory database, through reference to dimension dependency table(s). An in-memory database engine creates a comment bound to a first tuple via a first comment table in database level persistence. The first tuple comprises a first dimension (e.g., Product). A user then requests a second tuple comprising a second dimension (e.g., Product Group) that is related in some manner to the first dimension. In response, the in-memory database engine references a dimension dependency table of the in-memory database to determine dimension dependency information. Based upon that dimension dependency information, the in-memory database engine transforms the comment to also be bound to the second tuple via a second comment table in database level persistence. The second tuple is then returned to the user together with the comment, even though the second tuple may not explicitly share any dimensions with the first tuple to which the comment was originally bound. Embodiments may leverage the processing power of the in-memory database engine and its proximity to stored data, to rapidly and efficiently perform comment transformation by executing aggregation (e.g., join) operations.

An embodiment of a computer-implemented method comprises, an in-memory database engine of an in-memory database receiving a request for a first tuple from a planning application, the first tuple comprising a first dimension. Based upon the first dimension, the in-memory database engine references a dependency table stored in the in-memory database to produce dimension dependency information between the first dimension and a second dimension. Based on the dimension dependency information, the in-memory database engine transforms a comment stored with a second tuple, to be bound with the first tuple stored in the in-memory database, and the in-memory database returns the first tuple and the comment to the planning application.

A non-transitory computer readable storage medium embodies a computer program for performing a method comprising an in-memory database engine of an in-memory database receiving a request for a first tuple from a planning application, the first tuple comprising a first dimension. Based upon the first dimension, the in-memory database engine references a dependency table stored in the in-memory database to produce dimension dependency information between the first dimension and a second dimension. Based on the dimension dependency information, the in-memory database engine transforms a comment stored with a second tuple, to be bound with the first tuple stored in the in-memory database, the transforming comprising performing an aggregation operation. The in-memory database returns the first tuple and the comment to the planning application.

An embodiment of a computer system comprises one or more processors and a software program, executable on said computer system. The software program is configured to cause an engine of an in-memory database to receive a request for a first tuple from a planning application, the first tuple comprising a first dimension comprising a keyfigure including a time attribute. The software program is configured to cause the engine to, based upon the first dimension, reference a dependency table stored in the in-memory database to produce dimension dependency information between the first dimension and a second dimension. The software program is configured to cause the engine to, based on the dimension dependency information, transform a comment stored with a second tuple, to be bound with the first tuple stored in the in-memory database, wherein the transforming comprises, persisting in the in-memory database, a time series-like table storing fields of an existing time series table including the time attribute and a reference to the comment. The software program is configured to cause the engine to return the first tuple and the comment to the planning application.

In certain embodiments the transforming comprises performing an aggregation operation.

According to some embodiments the aggregation operation comprises a join operation.

Particular embodiments further comprise, prior to receiving the request the in-memory database engine receiving the comment with the second tuple, and the in-memory database engine creating the comment bound to the second tuple in a first comment table of the in-memory database.

According to various embodiments the in-memory database engine transforms the comment that is bound to the second tuple in a second comment table of the in-memory database.

In certain embodiments the first dimension comprises a first keyfigure.

According to particular embodiments the dimension dependency information comprises a dependency between the first keyfigure and the second dimension comprising a second keyfigure.

In some embodiments the first keyfigure comprises a time attribute, the in-memory database comprises a time series table including the time attribute, and the transforming further comprises persisting in the in-memory database a time series-like table storing fields of the time series table and a reference to the comment.

In various embodiments if the time series table already includes another comment, the method further comprises checking whether the reference should be inserted.

According to certain embodiments the first keyfigure comprises a time attribute, the in-memory database comprises a time series table including the time attribute, and the method further comprises adding a comment indicator to the time series table.

The following detailed description and accompanying drawings provide a better understanding of the nature and advantages of embodiments.

DETAILED DESCRIPTION

Described herein are methods and apparatuses implementing keyfigure commenting according to various embodiments. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
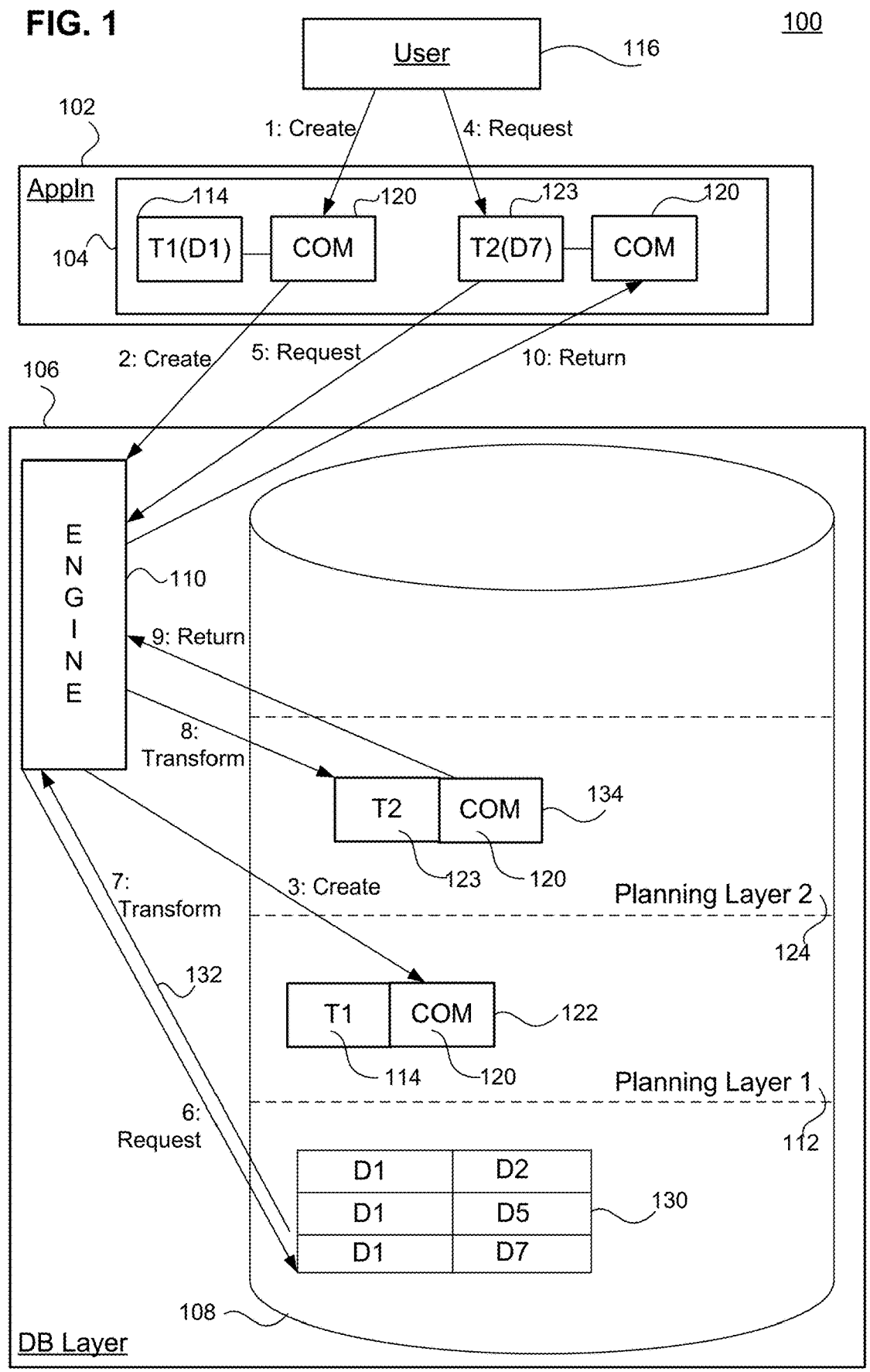
FIG. 1 shows a simplified diagram of a system according to an embodiment.

FIG. 1 shows a simplified view of a system configured to implement keyfigure commenting according to an embodiment. Specifically, system 100 comprises a planning application 102 including a user interface (UI) 104.

The planning application in turn is in communication with an in-memory database layer 106, which includes an in-memory database 108 and an in-memory database engine 110. The in-memory database includes a first planning layer 112 which includes data relevant to a first planning objective.

A first tuple (T1) 114 is stored in the first planning layer. The first tuple comprises a first dimension (D1), for example a particular product for purchase (e.g., a brand of beer). The first tuple is displayed in the planning application UI to the user 116, e.g., as a part of a particular keyfigure.

The user may recognize some aspect of particular importance regarding the first tuple and the planning objective. Accordingly, the user seeks to annotate that first tuple with an explanatory comment.

Thus as shown in 1., the user provides input to the UI to create a comment 120 to attach to the first tuple. In response receiving this input, in 2. the planning application is configured to communicate the comment to the in-memory database engine.

As shown in 3., the in-memory database engine in turn recognizes the new comment and binds it to the first tuple stored in the first planning level. This is done utilizing a first comment table 122 stored in the first planning layer, that associates the first tuple with the comment.

Later on in the planning process, the user may seek to access a second tuple (T2) 123 that is stored at a second planning level 124 of the in-memory database. Accordingly, in 4. the user issues another input to the UI requesting the second tuple T2 123.

The second tuple comprises data different from the first tuple. In particular, the second tuple references a second dimension (D7) that is distinct from the first dimension (D1).

However, the two dimensions D1 and D7 are related in some manner, for example through a hierarchy that is implicit or based upon a data mode. Thus dimension D7 may represent a Product Group dimension (e.g., beverages) that includes beer. In light of this relationship between dimensions, the user may desire for the comment originally created for the first tuple, to also be carried along for display when the second tuple is shown on the UI.

Accordingly, in 5. the in-memory database engine recognizes a request for the second tuple received from the planning application. Upon receiving this request, in 6. the in-memory database engine is configured to reference the dependency table 130.

Here, the dependency information 132 that is sent in 7. to the in-memory database engine, reveals dimension D7 as being related to dimension D1. In one specific example, dimension dependency information stored in the dependency table could reveal a Product Group dimension to be related to the Product dimension.

Upon processing this dimension dependency information, in 8. the in-memory database performs a transformation of the comment, binding it to the second tuple. This transformation is reflected in the second comment table 134 of the second planning layer storing the second tuple.

Following this transformation, in 9. the in-memory database engine receives the second tuple and also the comment bound thereto, from the second planning layer.

Finally, as shown in 10. the in-memory database engine communicates the second tuple along with the bound comment, back to the planning application. There, both T2 and the comment are displayed together. This commenting process occurs even though the first dimension D1 to which the comment was originally bound, is not explicitly a part of the second tuple.

Figure 2:
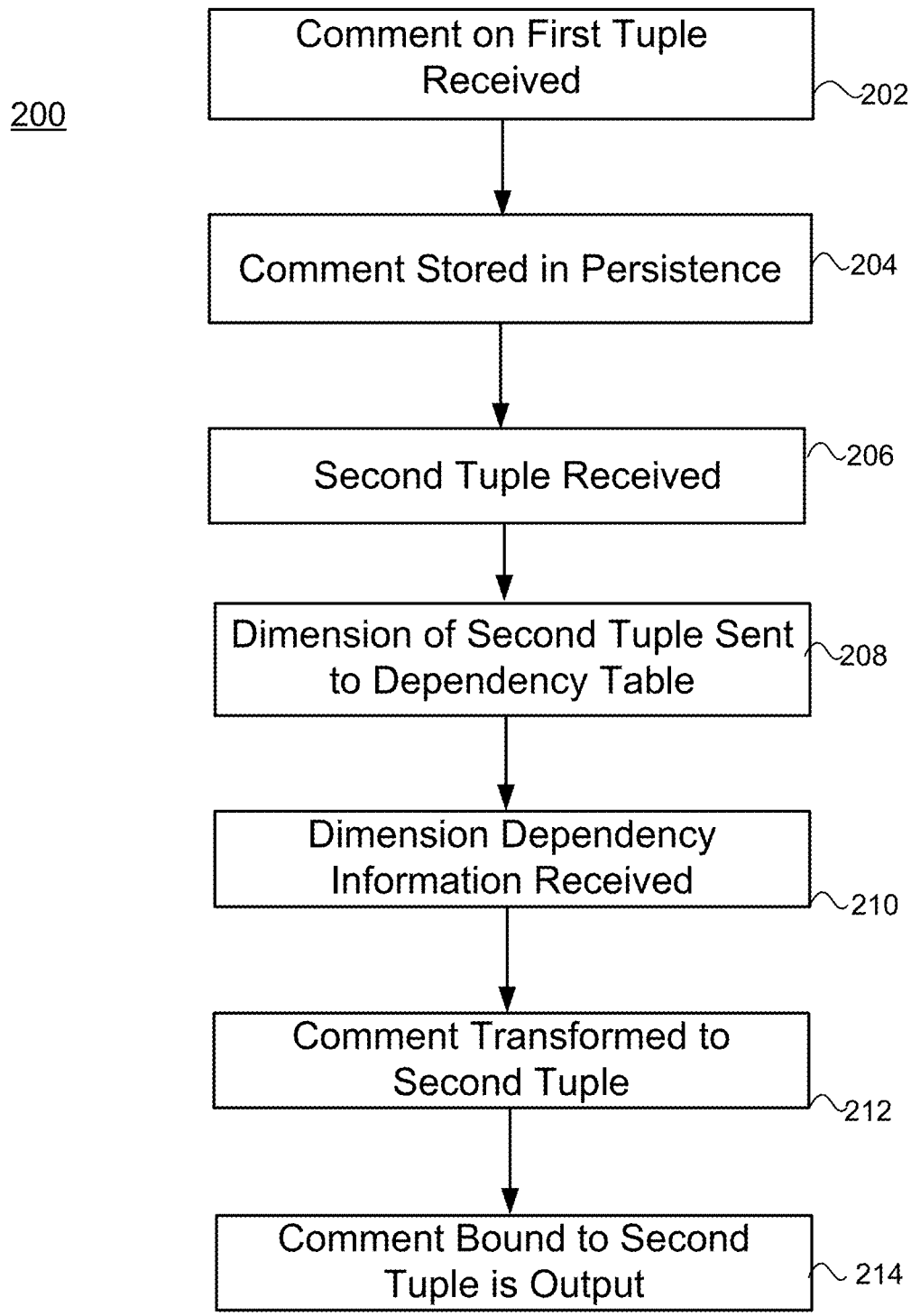
FIG. 2 shows a simplified flow diagram of a method according to an embodiment.

FIG. 2 is a flow diagram showing various actions taken in a method 200 according to an embodiment. At 202, an in-memory database receives a comment that is associated with a first tuple.

At 204, the in-memory database binds the comment to the first tuple by storing a comment table that is created in a database level persistence (e.g., a first planning layer). The comment table stores the comment together with a first dimension of the first tuple.

At 206, the in-memory database engine receives a request for a second tuple. That second tuple includes a second dimension.

At 208, the in-memory database engine provides the second dimension to a dimension dependency table stored in the in-memory database. At 210, the in-memory database receives from the dependency table, information reflecting the first dimension that is related to the second dimension.

At 212, based upon this dimension dependency information, the in-memory database engine transforms the comment. In particular, the in-memory database binds the comment to the second tuple in a second comment table stored in a persistence layer of the in-memory database.

At 214, the in-memory database produces as output the comment bound to the second tuple. That second tuple with the comment bound thereto, may be received by a planning application for display to a user. This is true notwithstanding the fact that the requested second tuple does not include the first dimension with which the comment was originally associated.

Figure 3:
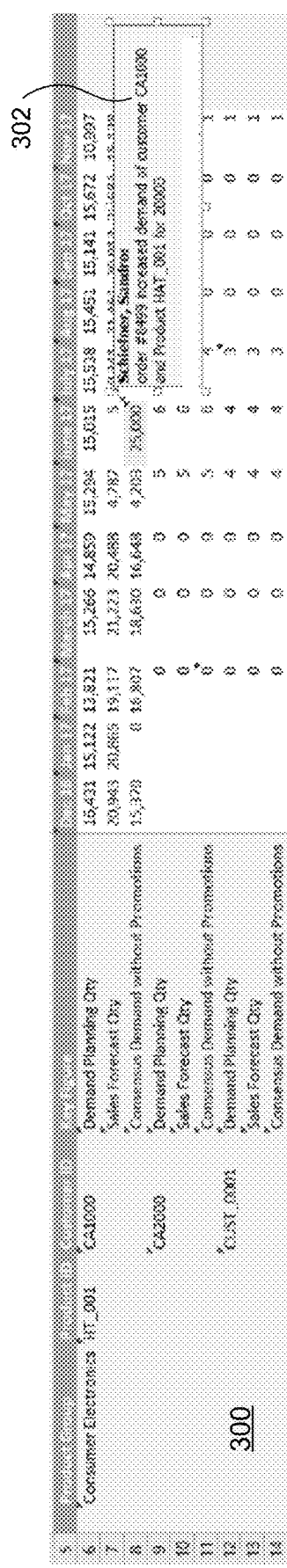
FIG. 3 shows an example of a screenshot including a comment according to an embodiment.

Various details of implementing a comments on a database persistence level according to particular embodiments, are now discussed in connection with the following example of FIGS. 3-4.

EXAMPLE

In order to impart desired flexibility upon keyfigure comments, certain embodiments may leverage the powerful and fast data processing capabilities of the engine available to an in-memory database (e.g., the HANA in-memory database available from SAP SE of Walldorf, Germany. In particular, comments bound at a planning view level are transformed by the HANA in-memory database engine, to other planning view levels upon user request.

For example a user may seek to comment upon a particular tuple comprising certain dimension(s) in one planning view, and also desire to see this comment reflected in other tuples that comprise related dimensions. Thus a user may want to create a comment for a $1^{st}$ tuple that includes a specific product name (e.g., "Paulaner" brand beer) as a value for the "Product" dimension of a keyfigure:

$1^{st}$ tuple=(Product. [Paulaner],Keyfigure. [ConsensusDemand],Time. [October 2017])

However, that "Paulaner" comment may have relevance for all beer purchases. Thus, the user may desire to see that comment also reflected on another keyfigure of an aggregated view on a $2^{nd}$ tuple including "Beer" as a value for the related "ProductGroup" dimension:

$2^{nd}$ tuple=(ProductGroup. [Beer],Customer. [Walmart], Time. [4. Quarter]).

To achieve that functionality, comments are stored on the planning view level, including tuples. Dimensions may be stored by the database in dependency table(s) also including dependencies between dimension attribute values, e.g. the dependency between the "Product" dimension (e.g., value "Paulaner") and the "Product Group" dimension (e.g., value "Beer")

More generally, a comment created for a first tuple comprising:
$1^{st}$ tuple=dimension5, dimension6, and dimension7 may be desired to be reflected in a requested keyfigure including a second tuple comprising:
2nd tuple=dimension1, dimension2, dimension3, and dimension4

In this generic example, comments are bound by the in-memory database engine on a planning view level persistence that comprises dimension5, dimension6, and dimension7. Upon request, the comments are transformed to a planning view level that comprises dimension1, dimension2, dimension3, and dimension4.

The basis for this transformation is dependency table(s) in the in-memory database that include dependencies between different dimensions. In this manner, the transformation of the comment between planning view persistence levels is achievable via an aggregation functionality (e.g., aggregate dimension "Product" to dimension "Product Group").

The following shows one example of an abstract Structured Query Language (SQL) statement (executable by the powerful HANA in-memory database engine) that serves to transform the comment to a different planning view level.

```
Select
dimension1,
dimension2,
dimension3,
dimension4 from comment_table as comments
inner join dimension_dependencies as dimensionDependencies on
comments.dimension5 = dimensionDependencies.dimension5 and
comments.dimension6 = dimensionDependencies.dimension6 and
comments.dimension7 = dimensionDependencies.dimension7
```

EXAMPLE

This example relates to the creation of comments that are bound at database level persistence, to data objects of the HANA in-memory database available from SAP SE of Walldorf, Germany. Access to the HANA data and comments bound thereto, is provided via the Integrated Business Planning (IBP) application also available from SAP SE. The IBP application leverages data and comment visualization capabilities of the EXCEL spreadsheet program of the Microsoft Corp. of Redmond, Washington.

In particular, it may be desired for a planning application to record comments at an aggregate level. Those comments may provide additional business meaning to the data by capturing any assumptions, reasons and information that can be shared with other planners to collaborate.

IBP Comments will be shown as EXCEL comments. A filter for priority, user, and level (e.g., same level or aggregated level) can be set in the planning view setting In this particular example, sales planner (Sandro Schiefner) receives from customer (CA1000), an order for an additional 20k pieces of a product (HT_001). As shown in FIG. 3 the sales planner accesses data on the IBP at the customer level 300.

Each keyfigure may have a combination of attributes and a periodid defined. Keyfigure values are stored in this base planning level.

Data at this customer level 300 represents aggregation from the base planning database level per the following attributes:
Product Group=Consumer Electronics
Product ID=HT 001
Customer ID=CA1000; CA2000; CUST 001; and CUST 003
KeyFigure=Demand Planning Qty; Sales Forecast Qty; and Consensus Demand without Promotions
Time Period=December 2016-November 2017.

At this point, the sales planner seeks to add comment(s) to keyfigure(s) reflecting data of the aggregated customer level. As shown in FIG. 3, this comment 302 to the changed cell 304 explains that the high increase of the new demand results from the new customer order.

Later, a different reviewer (e.g., the General Manager) may seek to review the plan on a global level. That General Manager will be curious to understand reason(s) underlying the increase in customer demand.

Accordingly, upon accessing the aggregated customer data from the IBP, the General Manager will be able to review the comments and understand why there was an increase in demand.

Figure 4:
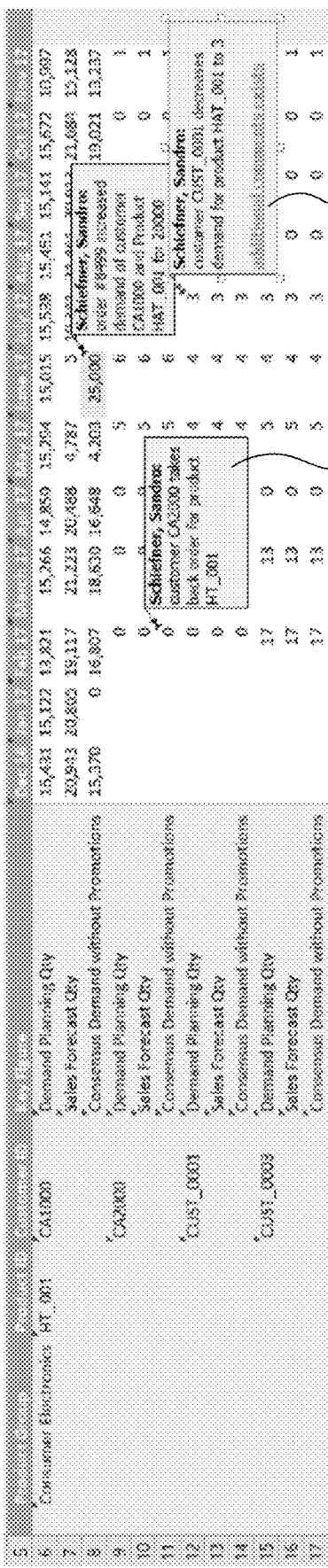
FIG. 4 shows another example of a screenshot including a comment according to an embodiment.

FIG. 4 shows that multiple comments may be added depending upon the complexity of the particular fact situation. Here, a second comment 306 may indicate that a different customer (CA2000) took back an order for the HT_001 product.

Moreover, a third comment 308 may indicate that yet another customer (CUST_001) decreased demand for the HT_001 product. If multiple comments exist for the same cell, certain embodiments may display only the latest comment plus a link: "Additional Comments are available".

Figure 5:
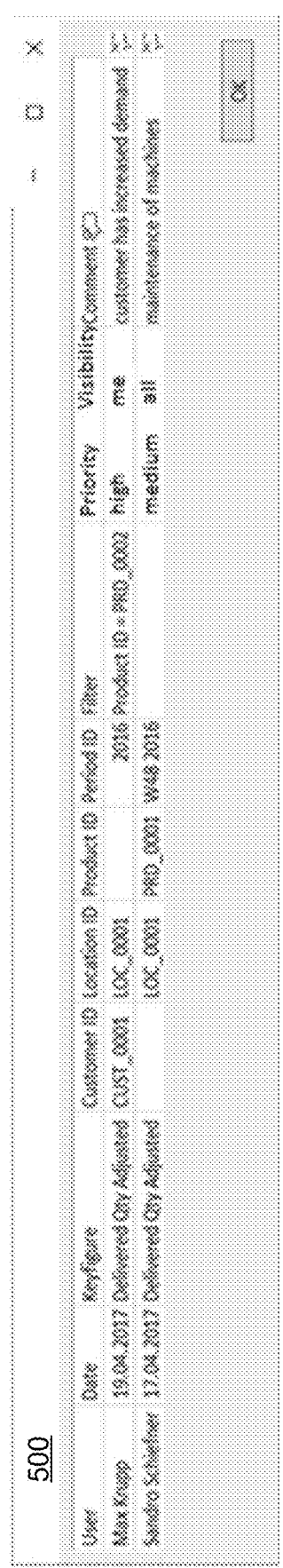
FIG. 5 shows an example of a dialog showing multiple comments according to an embodiment.

The user may right click on the cell to open the context menu, and from there open a new dialog that shows multiple comments. This is shown as 500 in FIG. 5. In this dialog comments can be updated or deleted.

EXAMPLE

As noted above, the IBP planning application is configured to display data via the existing mechanisms provided by EXCEL. Comments can be stored as follows.

Comments are stored at the planning view level seen by a user in the EXCEL sheet, and at the base planning level of the keyfigure. The planning view level includes the selected attributes, the selected time profile level, the filter settings and the visibility filter.

Figure 6:
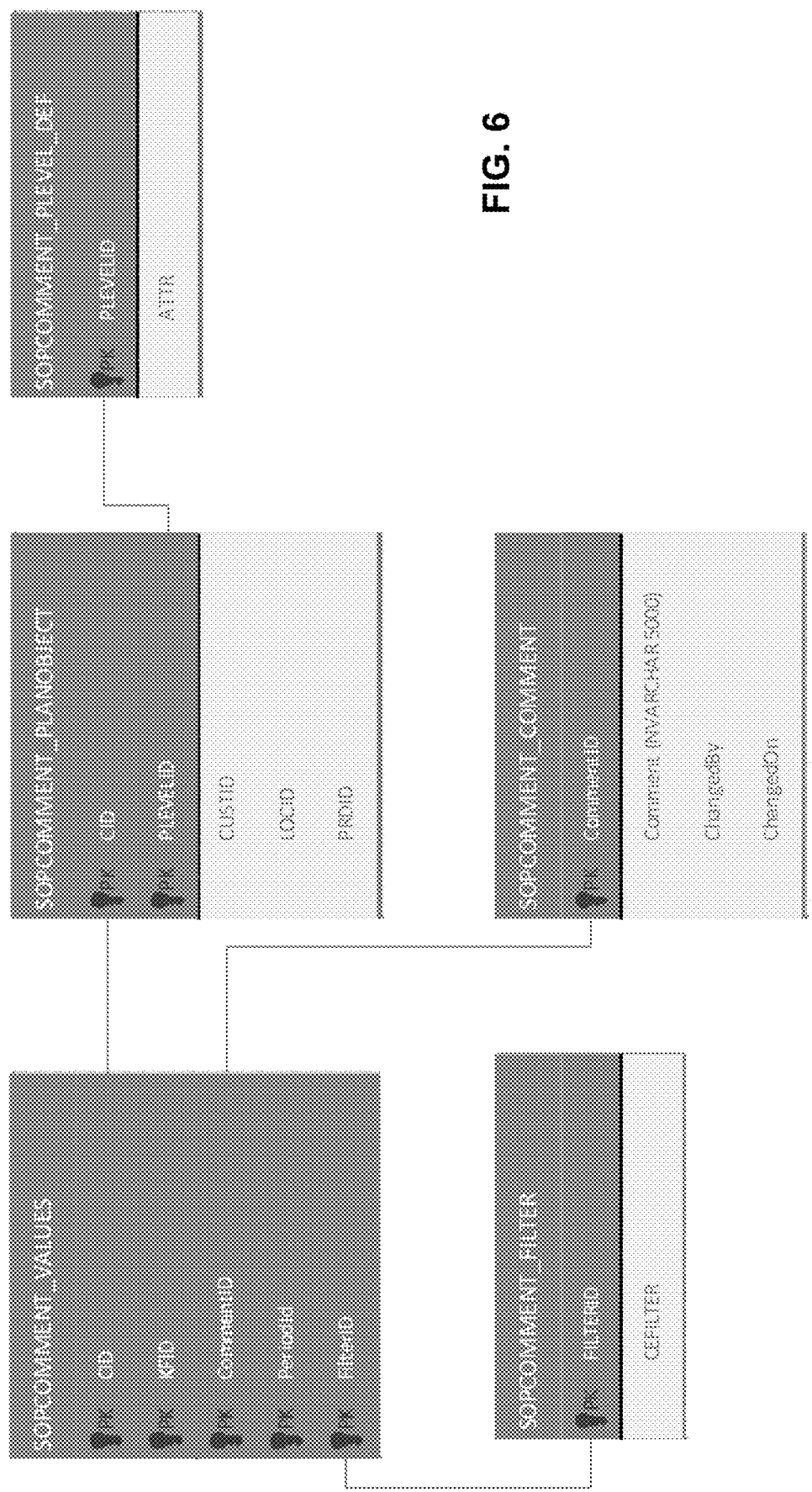
FIG. 6 shows several planning view level containers that include comments.

As shown in FIG. 6, the result may be several planning view level containers that include comments. These containers are referred to herein as comment storage level containers.

A comment storage level container comprises a container of stored comments that are saved using comment storage level settings. A comment storage level setting defines a set of attributes, time profile level, planning filter, and/or the visibility filter used to store comments.

A comment storage level container is defined as a specific combination of attributes. Here, the attributes can be time level profile level, filter settings including visibility filter and keyfigure.

The definition of a comment storage level container is comment storage level setting. A comment storage level container exists for a keyfigure that has been earmarked for commenting.

In this example a user defines the following planning view level to display keyfigure data for the keyfigure: "Delivered Qty Adjusted".
Time profile level=Weekly
Selected Attributes=Customer ID; Location ID
Filter=CUST_0001 and CUST_0002 for attribute Customer ID
Visibility Filter for attribute Location ID=value Loc_001

The base planning level for the keyfigure "Delivered Qty Adjusted" is defined as:
Time profile level=Weekly
Planning level attributes=Customer ID; Location ID; Product ID The user enters a comment for the attribute combination: CUST_0001, LOC_001, for the keyfigure "Delivered Qty Adjusted", and for the time bucket "W44 2016".

The comment storage level container actually defined is a specific combination of attributes, time level profile level, filter settings (including visibility filter), and keyfigure appears as follows:
Time profile level=Weekly
Periodid=W44
Selected Attributes=Customer ID, Location ID
Filter=CUST_0001 and CUST_0002 for attribute Customer ID
Visibility Filter for attribute Location ID=filter for value Loc_001
Keyfigure=Delivered Qty Adjusted In this example the container now contains one comment. The following entries will be made in the comments table:

| SOPCOMMENT_PLEVEL_DEF ||
|---|---|
| PLEVELID | ATTR |
| 1111 | CUSTID |
| 1111 | LOCID |
| 1111 | PERIODID3 |

| SOPCOMMENT_PLANOBJECT |||||
|---|---|---|---|---|
| CID | PLEVELID | CUSTID | LOCID | PRDID |
| 2222 | 1111 | CUST_0001 | LOC_001 | <null> |

| SOPCOMMENT_VALUES ||||||
|---|---|---|---|---|---|
| CID | KFID | SCNID | PERIODID | FILTERID | COMMENTID |
| 2222 | ADJDELIVQTY | _BASELINE | 62456 | 3333 | 4444 |

| SOPCOMMENT_COMMENT ||||
|---|---|---|---|
| COMMENTID | COMMENT | ChangedBy | ChangedOn |
| 4444 | Sandro Schiefner: Fire in warehouse nothing was delivered. | User | 2017-02-16 12:00:00 |

| SOPCOMMENT_FILTER ||
|---|---|
| FILTERID | CEFILTER |
| 3333 | ( IN ("CUSTID","CUST_0001","CUST_0002") AND IN ("LOCID","LOC_001") |

Embodiments may improve the performance of the system including the in-memory database and engine. For example, to accelerate the comment read scenarios, a time series-like table can be introduced. That table stores same key fields as the time series table, and a reference to the comment. In this manner the comment is also stored at the base planning level of a keyfigure.

A calculation level represents a level of a keyfigure. For example, if a keyfigure value is stored on an aggregated level (e.g. region/month), the value needs to be disaggregated to the base planning level.

If the comment is stored on a calculation level, the comment is placed down into the base planning level. If a new combination is inserted to the planning view, the time series-like table may not be reconciled.

As an illustration, assume that the attribute combination CUST_0001 and LOC_001 aggregates three products: PRD_01, PRD_02, and PRD_03. If a comment is inserted to that combination, the comment reference (PLOBJID) is set for related entries in the base planning level.

| SOPDD_PLANOBJECT | | | |
|---|---|---|---|
| PLOBJID | CUSTID | LOCID | PRDID |
| 5555 | CUST_0001 | LOC_001 | PRD_01 |
| 5556 | CUST_0001 | LOC_001 | PRD_02 |
| 5557 | CUST_0001 | LOC_001 | PRD_03 |

| SOPCOMMENT_TIMESERIES | | | |
|---|---|---|---|
| PLOBJID | SCNNUM | PERIODID | COMMENTID |
| 5555 | _BASELINE | 62456 | 1 |
| 5556 | _BASELINE | 62456 | 1 |
| 5557 | _BASELINE | 62456 | 1 |

Comments may be accessed as follows. In the planning view setting dialog of the IBP application, a user could select to •not show comments, •show comments on a same level, or ·show comments on any level.

If the user elects to show comments on a same level, comments will be read together with the keyfigure values based on the settings defined in the planning view configuration. Only comments that are on the same level as the planning view configuration will be read.

If the user elects to show comments on any level, comments that were created on a different level will be read together with keyfigure values based on the settings defined in the planning view configuration. The requested settings to read the data, could be different than the settings that were used to store the comments. In this manner data may be shown with or without comments to a particular user.

Only the latest comment will be read and displayed together with keyfigure data in the planning view in EXCEL. If a user wants to see further comments, the user can click on the cell to open the context menu, and from there open a new dialog showing comments. This triggers a backend request showing appropriate comments.

Details regarding reading keyfigure data and comments on same level, are now described. Comments are stored at planning view level. As mentioned above, in order to achieve a fast read behavior, embodiments may store comments in a time series-like table.

When comments are to be read on same level, a join with calculation scenario, the time series-like table, and SOP-COMMENTS with filter on comment planning level, are performed. Only comments that were stored on the same level as the requested planning view level will be returned.

Details for reading keyfigure data and comments on any level, are now described. When comments will be read on any level, a join with calculation scenario and the time series-like table are performed. For this join, the data of the time series-like table is aggregated to the requested planning view level. Comments that were stored on any level and match with the planning level attributes and values will be returned.

Approaches for the handling of filters is now discussed. Different kinds of filters can be handled with comments. One type is filters used to store the comments like planning view filter or visibility filters. There are also filters to be considered in reading out the data, such as planning view filters, visibility filters, and filters that are used to store the comments.

Only filters having an impact on a comment for a keyfigure value may be stored. When the planning view filter would have a same impact as the stored comment filter, the stored comment filter may be ignored.

When a comment is stored, planning view filters and visibility filters will be inserted into the filter table SOP-COMMENT_FILTER and referenced to the SOPCOMMENT_VALUES table. In this manner the filter is a key attribute of the comment storage level.

Comments having a same attribute/keyfigure/time combination but different filter attributes, could be stored in different comment storage levels. Usage of different filter attributes when storing comments may have an impact on the total amount of comment storage levels.

The handling of comments upon keyfigures calculated but not stored, is now described. Comments on calculated (but not stored) keyfigures will be stored only in the comment storage level containers, and not in the time series-like table. Therefore comments to calculated (but not stored) keyfigures may only be read out from the comment storage level containers, and then needs to be joined to the calculation scenarios.

For reading comments independent of the calculation scenario, logic for visibility filter handling may be used. The reason for this is that no join to planning object table could be done.

Comment lifecycle is now discussed. Based upon an authorization (discussed below) various users can create, update, read and delete comments for a cell. It is possible to trigger operators that remove comments based on certain criteria. Example of such criteria can include but are not limited to specific users, user roles, creation data, keyfigure, attributes, priority, or time buckets. Thus in an example it may also be possible to trigger a reoccurring job removing comments older than a certain time period, from a particular person.

Comment authorization is now discussed. Authorization for comments may be based on the EXCEL authorization mechanism. That authorization obeys the rule that if a user can see a keyfigure cell, that user is also allowed to view comments of that cell. If a user is permitted to change a keyfigure cell, then the user is also allowed to add/modify a comment.

Consider the following authorization objects: IBP_VER; IBP_KEYFIG. It is also checked whether the user is allowed to see or edit comments from all users, or just those created by the user. IBP_COMMENTS contains scope attribute with values=OWN or ALL.

Comment fixation is now discussed. Keyfigure values of certain periods, could be manually fixed on the detailed or aggregated level. It may be possible to create a comment in EXCEL explaining reason(s) why a keyfigure value is fixed on the base planning level and the aggregated level. EXCEL may display comments for fixed keyfigure values on a given calculation level.

Communication with the Excel-client may work as follows. Data may be read using a slim query approach. The client reads data using a REST-based communication in JSON format.

The json defines the x-axis definition, the y-axis definition, the values, and the extended data. The definition of the x-axis comprises a definition of a row. The definition of the y-axis comprises a definition of a column.

Each definition of a row or a column is defined as a set of members that could include one or multiple dimensions. Each dimension has an identifier and a value.

The values may be represented as a comma separated list of the cell values, starting from top left and ending bottom right, concatenated row by row. The extended data section includes technical IDs, exception and messages that are needed by the Excel client.

According to a specific embodiment, there would be an X-axis that defines 4 members. The first member has the following 3 dimensions:
first dimension identifier is Customer ID and value is CUST_0001
second dimension identifier is Location ID and value is LOC_001
third dimension identifier is Keyfigure and value is Delivered Qty Adjusted.

The Y-axis has 3 members. The first member has one dimension with identifier month and value OCT 2016. The value comma separated list in this example looks like: 54783, 53285 and so on.

To support comments in the response, a new attribute value combination may be added to the request. The attribute will be SOPComments, and the value will be "CurrentLevel" for comments created for the planning view level, or "AllLevel" for comments created for planning view level or different level.

In the request, a new value string could be added that includes a comma-separated list of comment IDs for a cell value. If more than one comment ID for one cell exists, the comments may be separated with a '|'.

Meta information of a comment may be stored in an additional section in the extendedData area. Meta information for comments can include but are not limited to:
Id
modification date
userid,
username
edit ability
value.

The writing of data using the query pattern, is now discussed. Changed values may be transferred within the parameter SOPCellChanges. For created comments, there may be a new parameter SOPCommentChanges but similar setup. Instead of listing all attributes, only attributes with values may be supported.

Comment handling where a non-root-attribute was changed for a created comment, is now discussed. In particular, comments are created at a certain time for a specific attribute, time and keyfigure combination.

If later on, a non-root-attribute for that a created comment was changed, a comment may still be expected to be displayed. Consider, for example, the following persisted data:

| CUSTID | CUSTREGION | PRDID | PRDGRP | KF | Periodid | Comment on Attribute Combination: CUSTREGION, PRDGRP |
|---|---|---|---|---|---|---|
| C1 | CR1 | P1 | PG1 | KF1 | PID1 | COMMENT1 (CR1, PG1) |
| C2 | CR1 | P2 | PG1 | KF1 | PID1 | COMMENT1 (CR1, PG1) |
| C3 | CR1 | P3 | PG1 | KF1 | PID1 | COMMENT1 (CR1, PG1) |
| C4 | CR2 | P4 | PG1 | KF1 | PID1 | COMMENT2 (CR2, PG1) |
| C5 | CR3 | P5 | PG1 | KF1 | PID1 | No comment (CR3, PG1) |

A user stores a comment to the attribute combination: product group and customer region. Later, the user changes the non-root-attribute-value for some attribute combinations. For example, the user changes the CUSTREGION of C1 from CR1 to CR2, and the CUST REGION of C2 from CR1 to CR3.

| CUSTID | CUSTREGION | PRDID | PRDGRP | KF | Periodid | Comment on Attribute Combination: CUSTREGION, PRDGRP |
|---|---|---|---|---|---|---|
| C1 | CR2 | P1 | PG1 | KF1 | PID1 | (COMMENT2) |
| C2 | CR3 | P2 | PG1 | KF1 | PID1 | No comment (CR3, PG1) |
| C3 | CR1 | P3 | PG1 | KF1 | PID1 | COMMENT1 (CR1, PG1) |
| C4 | CR2 | P4 | PG1 | KF1 | PID1 | COMMENT2 (CR2, PG1) |
| C5 | CR3 | P5 | PG1 | KF1 | PID1 | No comment (CR3, PG1) |

A flag may be stored if a comment exists. Thus, that flag may need to be reset.

Certain embodiments may employ a comment indicator. Details regarding the implementation of such a comment indicator are described later below.

Here, if a user creates a new planning object, it should also be determined whether the comment indicator should be set. If a user deletes attribute value CR2 of the attribute CUSTREGION, it may be necessary to get rid of COMMENT2 that was created for combination CR2 and PG1.

One approach to addressing this issue may be to include two new columns in the planobject table: Createddate and lastmodifieddate. Initially the created date would be set to the date and time when the batch or planning controller or disaggregation created a new planobject entry.

The lastmodifieddate will be set to the date when the batch modifies the planobject entry. Initially it is not set. Data Integration will create new planning objects only for attribute as keyfigures.

When the data integration batch is finished, an entry will be set to a table containing the following fields:

List Changed Attributenames (better possibility to filter for planobject entries)
Lastmodifieddate
affected planobject tables
plan areas
version
status (new, in process, finished, failed)

The comment functionality has a job that will regularly look for a new created and then perform the follow up action, to consolidate the comment indicator flag in the time series table. If the job catches the entry it sets it to in process, if the job finished the entry it sets it to finished and failed to finish with a log id. Only one job should be executed at a time.

If a non-root attribute is changed, it does not affect for the persisted comment information. Realignment may not occur.

According to certain embodiments, where a user wants to add comments to a specific keyfigure within a time period, the comments will be stored on the level of the defined planning view setting (not on the base planning level of the keyfigure). This approach may not save the disaggregation, but may perform aggregation/disaggregation when reading the data.

This approach avoids storing a large volume of redundant data. In an example, a user stores a comment for the keyfigure: consensus demand on an aggregated level, with the attribute combination, product id and location id within the time profile level month.

There would not be a disaggregation to the base planning level of that keyfigure which would be: product id, location id and customer id within the time profile level technical week.

In summary, this approach increases the speed of the saving. However, it may involve a complex join condition when reading out the data.

According to some embodiments, the comments should be close to the cell values. One approach could be to add the comment id next to the cell value, e.g.: 54783(1001|1002), 53285.

There would then be an additional section in the extendedData area where the id, keyword, modification date, userid, username, priority, edit ability, and value, for each comment id is defined.

In contrast, alternative embodiments may not store the comments to the cell values. Rather, there would be another concatenated list that just contains comment ids. As with the initial approach, there would be an extension needed for the extendedData area.

According to a third approach, instead of using a slim query, the standard EPM format is used. That format already supports comment creation and display.

Various alternative approaches regarding a comment indicator are now discussed. Some embodiments may dispense with the comment indicator altogether.

An alternative embodiment may include the comment indicator as keyfigure in a same planning level in a time series table.

Another alternative embodiment may add a comment indicator as an additional keyfigure in time series table. This approach may use separate planning levels based on the planning level of the dependent keyfigure, but add a dummy attribute.

In some variations, planning objects for the comment planning levels are initially created when base planning objects are created. To reduce memory consumption, other variations may create planning objects for the comment planning levels on request.

Still other embodiments may include the comment indicator as keyfigure=view CV (AV only keyfigure from one table).

Yet other embodiments may add the comment indicator in a separate time series-like table. Keys of that table may be: PLOBJID, SCNNUM, PERIODID.

Using the same planning level as the dependent keyfigure, some variations may utilize Join to calc scenario (same layout logic). Other variations may employ two parallel reads and merge in higher level (e.g. UI or UI service) (same layout logic). Still other variations may rely upon two parallel reads and merge in higher level (e.g. UI or UI service) (own layout logic).

Various approaches for joining a comment with planning view data are now discussed. It turned out that a large percentage of the query service is consumed in the layout logic part. Employing parallel reads and merging at a higher level would result in the expensive layout logic part being executed twice.

Performance was also measured on a variation involving a parallel service that retrieves comments from the comment storage level containers instead of the indicator table.

To better support the possibility to filter for planning level, user, and priority, certain embodiments may store a comment reference instead of just an indicator. This will increase the size of the comment time series table, but would yield more functional possibilities. The processing power and large data handling capacity available to an in-memory database (e.g., HANA), should allow for implementation of such an alternative embodiment utilizing a comment reference.

An issue may arise in connection with the following scenario. A comment exists for the attribute combination: customer CUST_001, location LOC_001, periodid September 2017, and keyfigure consensusdemand.

The keyfigure consensusdemand has base planning level customer, location, product. In the comment time series table, the comment is disaggregated to the base planning level. If a new combination for a product is created, it needs to be checked whether an entry to the comment time series table for the new combination should be inserted or not.

According to some embodiments, whenever a keyfigure value is inserted to the new combination, a check if comments exist will be executed. If the new combination matches with existing comments, a new entry to the comment time series table will be inserted. Examples of import parameters to that check may be planning area, version, plobjid, periodid, and keyfigure. A same check will be executed if new attributions will be created within simulation. For that scenario, additionally the transaction ID will be given to that check.

Comments to empty cells may not be supported in some embodiments. Only when time series entries exist or will be created, can comments can be stored or existing comments stored.

An issue may arise in connection with the following scenario. A comment is inserted to a stored calculated keyfigure for a certain attribute combination and period. The keyfigure value came from a default logic; the stored calculated keyfigure does not have planning objects or time series entries.

According to some embodiments if no planning objects exist for that keyfigure, a message will be issued that first planning objects need to be created. If planning objects are then created, plobjid, period, version, and keyfigure will be given to the comment create service. For such a scenario only planning objects (and not time series entries) may exist. An operator that removes unused planning objects may look also in comment time series table to double check if planning objects are needed or not.

Figure 7:
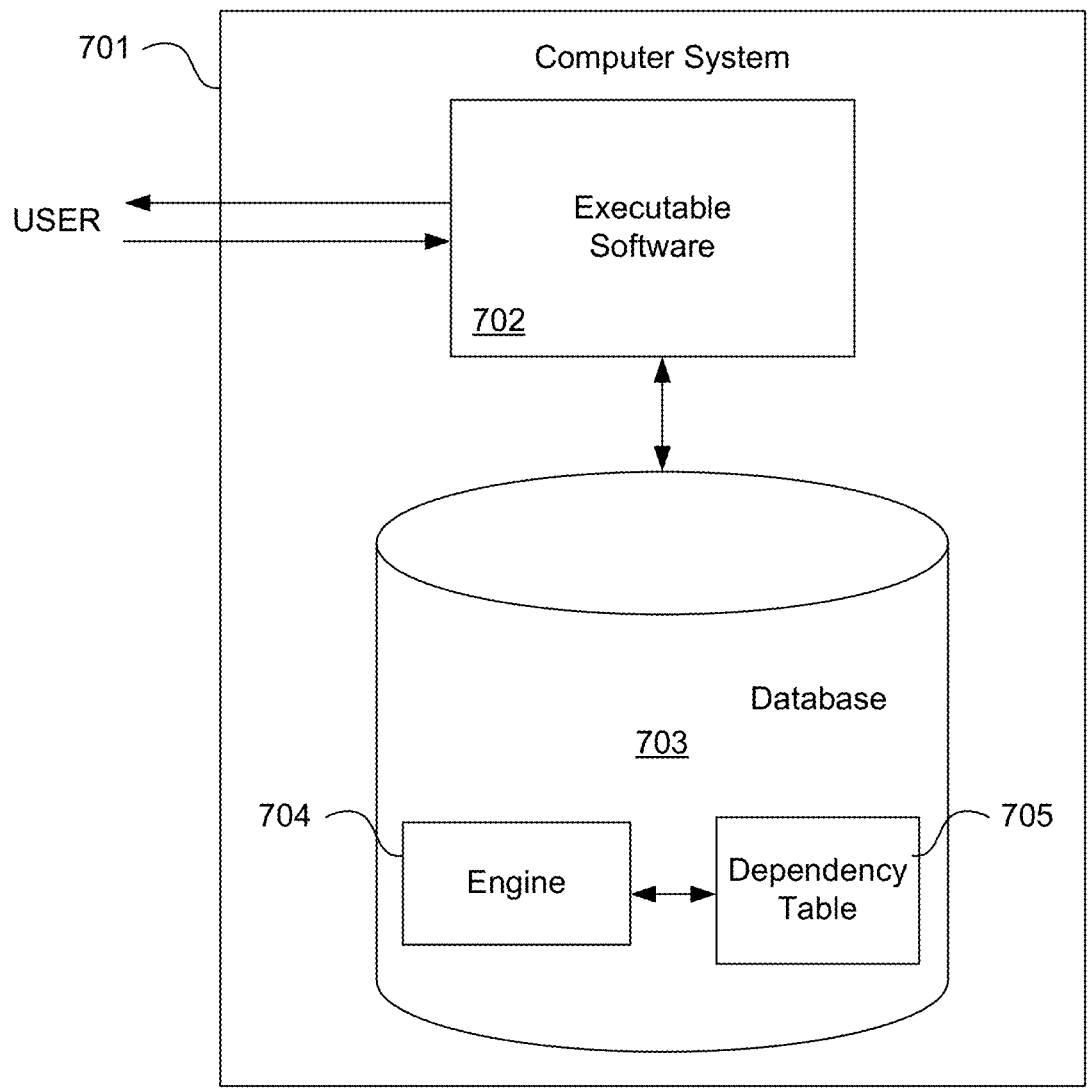
FIG. 7 illustrates hardware of a special purpose computing machine configured to implement commenting according to an embodiment.

Certain embodiments may be implemented in connection with an in-memory database, with the in-memory database engine performing one or more of the comment creation and transformation functions. FIG. 7 illustrates hardware of a special purpose computing machine configured to implement keyfigure commenting according to an embodiment. In particular, computer system 701 comprises a processor 702 that is in electronic communication with a non-transitory computer-readable storage medium comprising a database 703. This computer-readable storage medium has stored thereon code 705 corresponding to a dependency table. Code 704 corresponds to an in-memory database engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 8:
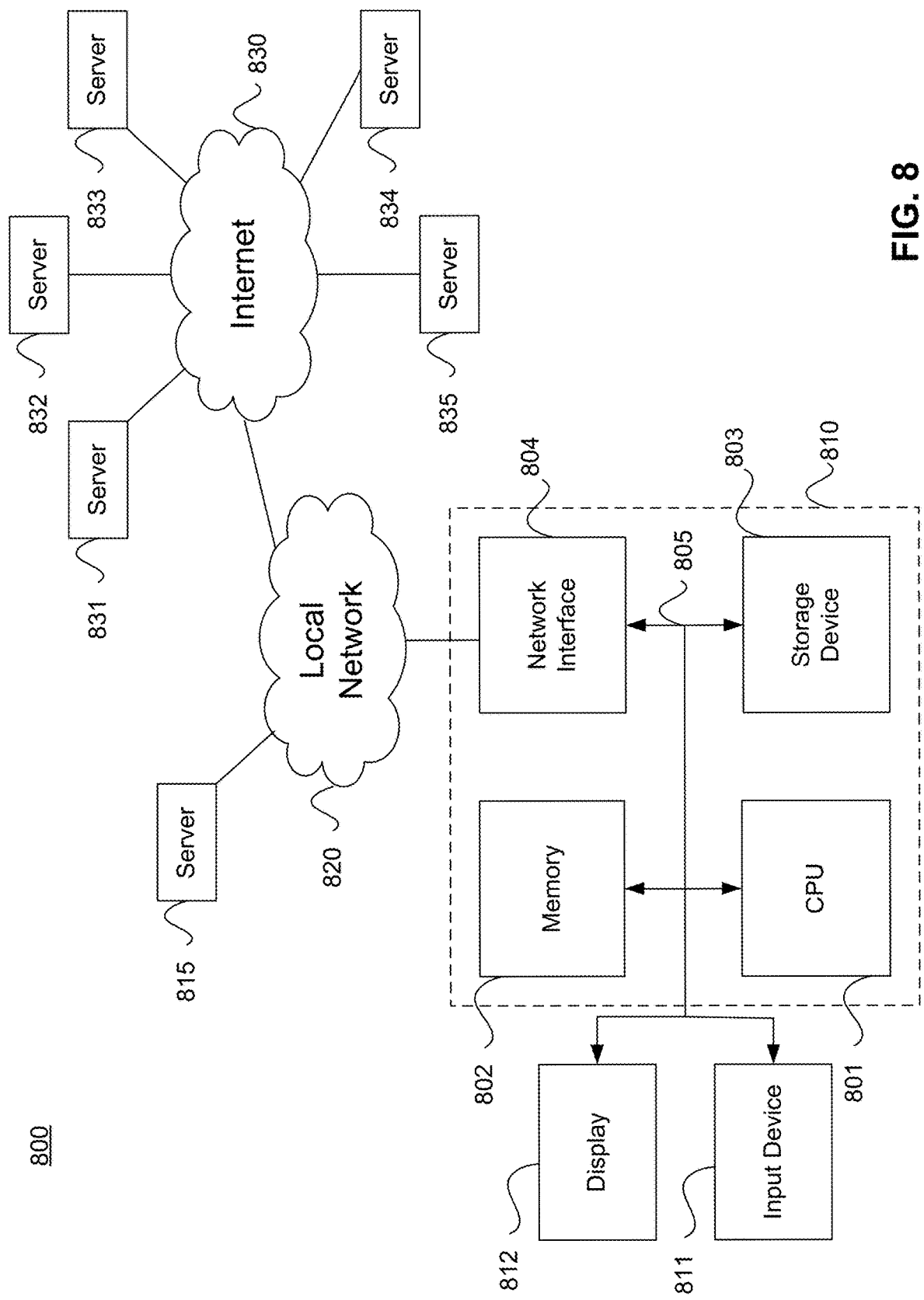
FIG. 8 illustrates an example computer system.

An example computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   an in-memory database engine of an in-memory database receiving a request for a first tuple from a planning application, the first tuple comprising a first dimension, the first dimension comprising a first keyfigure, the first keyfigure comprising a time attribute, the in-memory database comprising a time series table including the time attribute;
   based upon the first dimension, the in-memory database engine referencing a dependency table stored in the in-memory database to produce dimension dependency stored in the dependency table, the dimension dependency information revealing the first dimension as being related to the second dimension;
   based on the dimension dependency information, the in-memory database engine transforming, using a join operation, a comment stored with a second tuple to be bound at database level persistence with the first tuple stored in the in-memory database, the transforming further comprising persisting in the in-memory database a time table storing fields of the time series table and a reference to the comment; and
   the in-memory database returning the first tuple and the comment to the planning application.

2. A method as in claim 1 further comprising:
prior to receiving the request, the in-memory database engine receiving the comment with the second tuple; and
the in-memory database engine creating the comment bound to the second tuple in a first comment table of the in-memory database.

3. A method as in claim 2 wherein the in-memory database engine transforms the comment that is bound to the second tuple in a second comment table of the in-memory database.

4. A method as in claim 1 wherein the first dimension comprises a first keyfigure.

5. A method as in claim 4 wherein the dimension dependency information comprises a dependency between the first keyfigure and the second dimension comprising a second keyfigure.

6. A method as in claim 4 wherein:
if the time series table already includes another comment, the method further comprising checking whether the reference should be inserted.

7. A method as in claim 4 wherein: the first keyfigure comprises a time attribute; the in-memory database comprises a time series table including the time attribute; and the method further comprises adding a comment indicator to the time series table.

8. A non-transitory computer readable storage medium embodying a computer program for performing a method, said method comprising:
an in-memory database engine of an in-memory database receiving a request for a first tuple from a planning application, the first tuple comprising a first dimension, the first dimension comprising a first keyfigure, the first keyfigure comprising a time attribute, the in-memory database comprising a time series table including the time attribute;
based upon the first dimension, the in-memory database engine referencing a dependency table stored in the in-memory database to produce dimension dependency information stored in the dependency table, the dimension dependency information revealing the first dimension as being related to the second dimension;
based on the dimension dependency information, the in-memory database engine transforming, using a join operation, a comment stored with a second tuple to be bound at database level persistence with the first tuple stored in the in-memory database, the transforming further comprising persisting in the in-memory database a time table storing fields of the time series table and a reference to the comment; and
the in-memory database returning the first tuple and the comment to the planning application.

9. A non-transitory computer readable storage medium as in claim 8 further comprising:
prior to receiving the request, the in-memory database engine receiving the comment with the second tuple; and
the in-memory database engine creating the comment bound to the second tuple in a first comment table of the in-memory database.

10. A non-transitory computer readable storage medium as in claim 9 wherein the first dimension comprises a first keyfigure.

11. A computer system comprising:
one or more processors;
a software program, executable on said computer system, the software program configured to cause an engine of an in-memory database to:
receive a request for a first tuple from a planning application, the first tuple comprising a first dimension comprising a keyfigure including a time attribute, the in-memory database comprising a time series table including the time attribute;
based upon the first dimension, reference a dependency table stored in the in-memory database to produce dimension dependency information stored in the dependency table, the dimension dependency information revealing the first dimension as being related to the second dimension;
based on the dimension dependency information, transform, using a join operation, a comment stored with a second tuple to be bound at database level persistence with the first tuple stored in the in-memory database, wherein the transforming comprises
persisting in the in-memory database, a time table storing fields of the time series table including the time attribute and a reference to the comment; and
return the first tuple and the comment to the planning application.

12. A computer system as in claim 11 wherein the software program is further configured to cause the in-memory database engine to:
prior to receiving the request, receive the comment with the second tuple; and
create the comment bound to the second tuple in a comment table of the in-memory database.

13. A computer system as in claim 12 wherein the software program is further configured to cause the in memory database engine to:
bind the comment to the first tuple in another comment table of the in-memory database.

* * * * *